US010018282B2

(12) United States Patent
Hirai

(10) Patent No.: US 10,018,282 B2
(45) Date of Patent: Jul. 10, 2018

(54) FLOW RATE ADJUSTING DEVICE

(71) Applicant: Surpass Industry Co., Ltd., Saitama (JP)

(72) Inventor: Kazuki Hirai, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 0 days.

(21) Appl. No.: 15/651,294

(22) Filed: Jul. 17, 2017

(65) Prior Publication Data

US 2018/0023726 A1  Jan. 25, 2018

(30) Foreign Application Priority Data

Jul. 20, 2016  (JP) ................................ 2016-142408

(51) Int. Cl.
*F16K 31/12* (2006.01)
*F16K 31/365* (2006.01)
*F16K 31/122* (2006.01)

(52) U.S. Cl.
CPC ........ *F16K 31/365* (2013.01); *F16K 31/1221* (2013.01)

(58) Field of Classification Search
CPC ............. F16K 27/0254; F16K 31/1262; F16K 31/1266; F16K 47/08
USPC ....................................... 251/61.5, 126, 339
See application file for complete search history.

(56) References Cited

U.S. PATENT DOCUMENTS

| | | | | |
|---|---|---|---|---|
| 5,575,311 A * | 11/1996 | Kingsford | ............. | F16K 11/022 137/625.5 |
| 6,276,491 B1 * | 8/2001 | Schonfeld | ............. | F16C 29/025 137/501 |
| 6,782,920 B2 * | 8/2004 | Steinke | ................... | F16K 47/08 137/625.3 |
| 9,010,719 B2 * | 4/2015 | Hirai | ................... | F16K 31/1266 251/61.1 |
| 9,228,673 B2 * | 1/2016 | Hirai | ....................... | G05D 7/03 |
| 9,304,517 B2 * | 4/2016 | Hirai | ...................... | G05D 7/012 |
| 9,506,572 B2 * | 11/2016 | Hirai | ....................... | G05D 7/03 |
| 2004/0262565 A1 | 12/2004 | Igarashi | | |

FOREIGN PATENT DOCUMENTS

JP        2004-162774 A       6/2004

* cited by examiner

*Primary Examiner* — Eric Keasel
(74) *Attorney, Agent, or Firm* — Muncy, Geissler, Olds & Lowe, P.C.

(57) ABSTRACT

Provided is a flow rate adjusting device in which a body portion having a valve hole includes: an annular wall portion that partitions a downstream-side fluid chamber into an inside flow channel annularly formed around a valve body portion and an outside flow channel annularly formed at an outside of the inside flow channel; an outflow hole that guides the fluid circulating in the outside flow channel to an outflow-side flow channel; and a blocking wall that blocks the fluid having reached the outflow hole from flowing around the outside flow channel. The annular wall portion includes a communication flow channel that guides the fluid from the inside flow channel to the outside flow channel. The communication flow channel guides the fluid to a location that is adjacent to the blocking wall and is isolated from the outflow hole by the blocking wall.

3 Claims, 6 Drawing Sheets

FLOW RATE ADJUSTING DEVICE

CROSS-REFERENCE TO RELATED APPLICATIONS

This application is based on Japanese Patent Application No. 2016-142408, the contents of which are incorporated herein by reference in its entirety.

TECHNICAL FIELD

The present disclosure relates to a flow rate adjusting device.

BACKGROUND ART

A flow rate adjusting device including a flow rate adjusting portion that adjusts the flow rate of a liquid, such as a drug solution or pure water, which is used for semiconductor manufacturing devices has been conventionally known (for example, see Japanese Unexamined Patent Application, Publication No. 2004-162774 (hereinafter referred to as "JP 2004-162774")).

The flow rate adjusting device disclosed in JP 2004-162774 has a structure in which a compression chamber is pressurized to depress a diaphragm so as to allow a valve body to be spaced apart from a valve seat, thereby causing a fluid to flow from an upstream-side first space into a downstream-side second space. The second space communicates with an exit port, so that the fluid flowing into the second space flows to the outside of the device from the exit port.

SUMMARY

Technical Problem

However, in the flow rate adjusting device disclosed in JP 2004-162774, the second space is a space formed so as to surround the valve body. The fluid flowing from the first space into the second space is liable to flow linearly toward the exit port. Accordingly, in the second space, a linear flow of the fluid toward the exit port from the valve body is generated, while the fluid is liable to be accumulated in the other areas. When the fluid is accumulated in a specific area of the second space, a failure occurs due to the fluid itself, degradation of a housing that forms the area, and the like.

The present disclosure has been made in view of the above-mentioned circumstances, and an object of the present disclosure is to provide a flow rate adjusting device that prevents a failure due to accumulation of a fluid by guiding the fluid to an outflow hole without accumulating the fluid flowing into a fluid chamber from a space between a valve body portion and a valve hole, in the fluid chamber.

Solution to Problem

To solve the above-mentioned problems, the present disclosure employs the following solutions.

A flow rate adjusting device according to one aspect of the present disclosure includes: a valve body portion movable along an axis line; a body portion having a valve hole into which the valve body portion is inserted; a diaphragm portion that is coupled to the valve body portion and partitions an inside space of the body portion into a fluid chamber and a gas chamber, a fluid flowing in from the valve hole circulating in the fluid chamber; and a flow rate adjusting portion that adjusts an interval between the valve body portion and the valve hole by allowing the diaphragm portion to move along the axis line. The body portion includes: an inflow-side flow channel that guides a fluid flowing in from an inflow port to the fluid chamber; an outflow-side flow channel that guides a fluid flowing out from the fluid chamber to an outflow port; an annular wall portion that partitions the fluid chamber into an inside flow channel and an outside flow channel, the inside flow channel being annularly formed around the valve body portion, the outside flow channel being annularly formed at an outside of the inside flow channel; an outflow hole that guides a fluid circulating in the outside flow channel to the outflow-side flow channel; and a blocking wall that is disposed in the outside flow channel and blocks the fluid having reached the outflow hole from flowing around the outside flow channel. The annular wall portion includes a communication flow channel that guides the fluid from the inside flow channel to the outside flow channel. The communication flow channel guides the fluid to a location that is adjacent to the blocking wall and is isolated from the outflow hole by the blocking wall.

In the flow rate adjusting device according to one aspect of the present disclosure, the fluid flowing into the inside flow channel of the fluid chamber from the valve hole is guided to the outside flow channel through the communication flow channel included in the annular wall portion. The fluid guided to the outside flow channel flows into the location, which is adjacent to the blocking wall and is isolated from the outflow hole by the blocking wall, circulates along a direction apart from the blocking wall, and finally reaches the outflow hole. The fluid having reached the outflow hole is blocked from flowing around the outside flow channel by the blocking wall, so that the whole amount of the fluid is guided to the outflow-side flow channel through the outflow hole. In the outside flow channel, the blocking wall generates a flow of the fluid that is circulating in one direction from the location isolated from the outflow hole by the blocking wall to the location of the outflow hole after flowing substantially about the axis line, thereby preventing the accumulation of the fluid in the chamber. Further, since the outside flow channel is formed substantially about the axis line, a pressure from the fluid circulating in the outside flow channel can be uniformly imparted to each location of the diaphragm portion.

Thus, the flow rate adjusting device according to one aspect of the present disclosure can prevent a failure due to accumulation of the fluid by guiding the fluid flowing into the fluid chamber from the space between the valve body portion and the valve hole to the outflow hole without accumulating the fluid, in the fluid chamber.

The flow rate adjusting device according to one aspect of the present disclosure may have a structure in which: the diaphragm portion includes a disk-shaped base to be coupled to the valve body portion, and a thin-film portion that is connected to the outer peripheral end of the base and is annularly formed; and when the base and the annular wall portion are in contact with each other, circulation of the fluid in a space between the inside flow channel and the outside flow channel is interrupted at a location other than a location where the communication flow channel is disposed.

With this structure, in an open state in which the base of the diaphragm portion and the annular wall portion are in contact with each other, the whole amount of the fluid flowing into the inside flow channel of the fluid chamber from the valve hole flows into the outside flow channel from the location where the communication flow channel is disposed, and does not flow into the outside flow channel from the other locations. Accordingly, it is possible to prevent the accumulation of the fluid by reliably forming a flow of the fluid that is circulating in one direction from the location isolated from the outflow hole by the blocking wall to the location of the outflow hole after flowing substantially about the axis line.

The flow rate adjusting device having a structure as described above may further include an urging member that imparts, to the valve body portion, a first urging force in a direction in which the urging member is in contact with the valve hole. The flow rate adjusting portion may impart, to the valve body portion, a second urging force in a direction in which the flow rate adjusting portion is spaced apart from the valve hole by a compressed air introduced into the gas chamber.

With this structure, the compressed air is introduced into the gas chamber to increase the second urging force, and a flow of the fluid that is circulating in one direction to the location of the outflow hole after flowing substantially about the axis line from the location isolated from the outflow hole by the blocking wall can be more reliably formed to thereby prevent the accumulation of the fluid.

Even if the gas chamber is excessively pressurized by the compressed air, the base of the diaphragm is in contact with the annular wall portion at a location other than the location where the communication flow channel is disposed, so that the pressure by the compressed air is received by substantially the whole circumference of the annular wall portion. Therefore, a failure such as damage to the flow rate adjusting device when the gas chamber is excessively pressurized by the compressed air can be prevented.

According to the present disclosure, it is possible to provide a flow rate adjusting device that prevents a failure due to accumulation of a fluid by guiding the fluid to an outflow hole without accumulating the fluid flowing into a fluid chamber from a space between a valve body and a valve hole, in the fluid chamber.

DESCRIPTION OF EMBODIMENT

Figure 1:
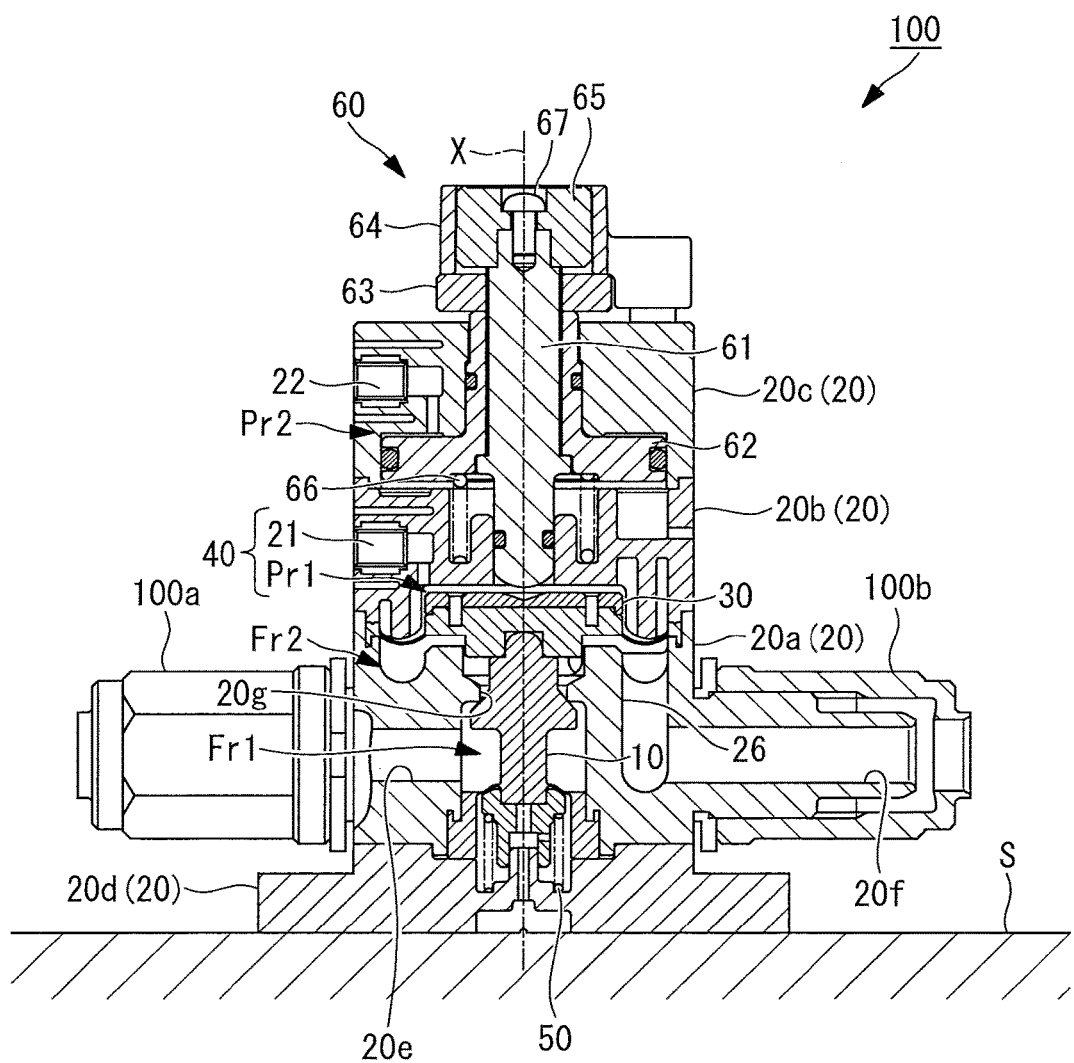
FIG. 1 is a partial longitudinal sectional view showing one embodiment of a flow rate adjusting device in a closed state.

A flow rate adjusting device 100 according to one embodiment of the present disclosure will be described below with reference to the drawings.

The flow rate adjusting device 100 of this embodiment is a device having a structure in which a fluid flowing into an inflow port 100a from an inflow-side pipe (not shown) is caused to flow out to an outflow-side pipe (not shown) from an outflow port 100b. The flow rate adjusting device 100 adjusts an interval between a valve hole 20g, which is described later, and a valve body portion 10, which is inserted into the valve hole 20g, thereby adjusting the flow rate of the fluid caused to flow out from the outflow port 100b.

Examples of the fluid in this embodiment include a drug solution, solvent, and pure water which are used for semiconductor manufacturing processes by semiconductor manufacturing devices.

As shown in FIG. 1, the flow rate adjusting device 100 of this embodiment includes the valve body portion 10 which is movable along an axis line X, a body portion 20, a diaphragm portion 30, a flow rate adjusting portion 40, a spring (urging member) 50, and a slow leak mechanism 60.

The valve body portion 10 is a shaft-like member that is movable along the axis line X and is used to adjust the flow rate of a fluid passing through a gap between the valve body portion 10 and the valve hole 20g. The flow rate adjusting portion 40 adjusts the interval between the valve body portion 10 and the valve hole 20g formed in the body portion 20, thereby adjusting the flow rate of the fluid passing through the gap between the valve body portion 10 and the valve hole 20g.

Figure 4:
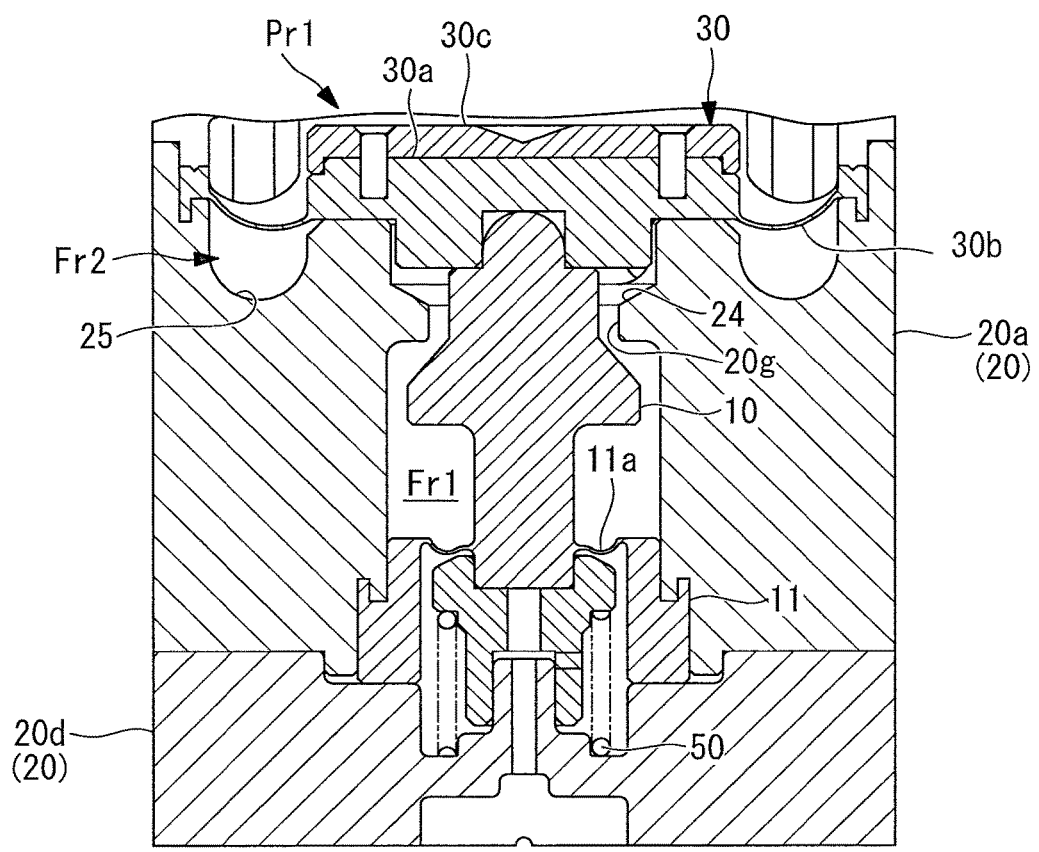
FIG. 4 is a sectional view taken along an arrow line II-II of the flow rate adjusting device shown in FIG. 3.

As shown in FIG. 4, the valve body portion 10 has an upper end coupled to a base 30a of the diaphragm portion 30, and has a lower end at which an attachment portion 11 to be attached to the body portion 20. The attachment portion 11 is a member that is integrally formed with a diaphragm 11a. The diaphragm 11a isolates an upstream-side fluid chamber Fr1 from a space in which a spring 50 is disposed.

The body portion 20 includes a first body portion 20a, a second body portion 20b, a third body portion 20c, and a fourth body portion 20d. The first body portion 20a, the second body portion 20b, the third body portion 20c, and the fourth body portion 20d are integrally coupled together by inserting a fastening bolt (not shown) extending in the direction along the axis line X into through-holes (not shown) which are formed in these portions and fastening the fastening bolt to a threaded portion (not shown).

The body portion 20 is formed of a fluororesin material such as PTFE (polytetrafluoroethylene), PCTFE (polychlorotrifluoroethylene), or PFA (tetrafluoroethylene-perfluoroalkyl vinyl ether copolymer).

The first body portion 20a is a member in which an inflow-side flow channel 20e, the upstream-side fluid chamber Fr1, the valve hole 20g, a downstream-side fluid chamber Fr2, an outflow hole 26, and an outflow-side flow channel 20f are formed. The fluid flowing in from the inflow port 100a circulates through the inflow-side flow channel 20e, the upstream-side fluid chamber Fr1, the valve hole 20g, the downstream-side fluid chamber Fr2, the outflow hole 26, and the outflow-side flow channel 20f in this order and then flows to the outside.

The inflow-side flow channel 20e is a flow channel that guides the fluid flowing in from the inflow port 100a to the upstream-side fluid chamber Fr1. The upstream-side fluid chamber Fr1 is a space that communicates with the inflow-side flow channel 20e and accommodates the valve body portion 10. The valve hole 20g is a circular hole that is formed about the axis line X. An upper end of the valve body portion 10 is inserted into the valve hole 20g. The downstream-side fluid chamber Fr2 is a space that communicates with the upstream-side fluid chamber Fr1 through the valve hole 20g. The outflow hole 26 is a hole that guides the fluid circulating in the downstream-side fluid chamber Fr2 to the outflow-side flow channel 20f. The outflow-side flow channel 20f is a flow channel that guides the fluid flowing out from the downstream-side fluid chamber Fr2 to the outflow port 100b.

The second body portion 20b is a member to be attached to an upper surface of the first body portion 20a. In a state where the second body portion 20b is attached to the first body portion 20a, an inside space that accommodates the diaphragm portion 30 is formed between the upper surface of the first body portion 20a and a lower surface of the second body portion 20b. The second body portion 20b is provided with a compressed air introduction port 21 for guiding a compressed air supplied from an external compressed air supply source (not shown) through a pipe to a first pressure chamber (gas chamber) Pr1.

The third body portion 20c is a member to be attached to an upper surface of the second body portion 20b. The slow leak mechanism 60 is accommodated in the third body portion 20c. The third body portion 20c is provided with a compressed air introduction port 22 for guiding the compressed air supplied from an external compressed air supply source (not shown) through a pipe to a second pressure chamber Pr2.

The fourth body portion 20d is a member to be attached to a lower surface of the first body portion 20a. The fourth body portion 20d is provided with a through-hole (not shown) extending in the direction along the axis line X. A fastening bolt (not shown) is inserted into the through-hole and fastened into a fastening opening (not shown), which is formed in an installation surface S, thereby fixing the flow rate adjusting device 100 to the installation surface S.

The diaphragm portion 30 is a member that partitions the inside space, which is formed between the upper surface of the first body portion 20a and the lower surface of the second body portion 20b, into the downstream-side fluid chamber Fr2 in which the fluid flowing in from the valve hole 20g circulates and the first pressure chamber Pr1 into which the compressed air is introduced from the compressed air introduction port 21.

As shown in FIG. 4, the diaphragm portion 30 includes the disk-shaped base 30a having a lower-end-side recess to be coupled to an upper end of the valve body portion 10, a thin-film portion 30b which is connected to an outer peripheral end of the base 30a and is annularly formed, and an upper plate portion 30c to be attached to an upper surface of the base 30a. The base 30a and the thin-film portion 30b are integrally formed of a fluororesin material.

The flow rate adjusting portion 40 includes the first pressure chamber Pr1 and the compressed air introduction port 21 for guiding the compressed air supplied from the outside to the first pressure chamber Pr1.

Figure 2:
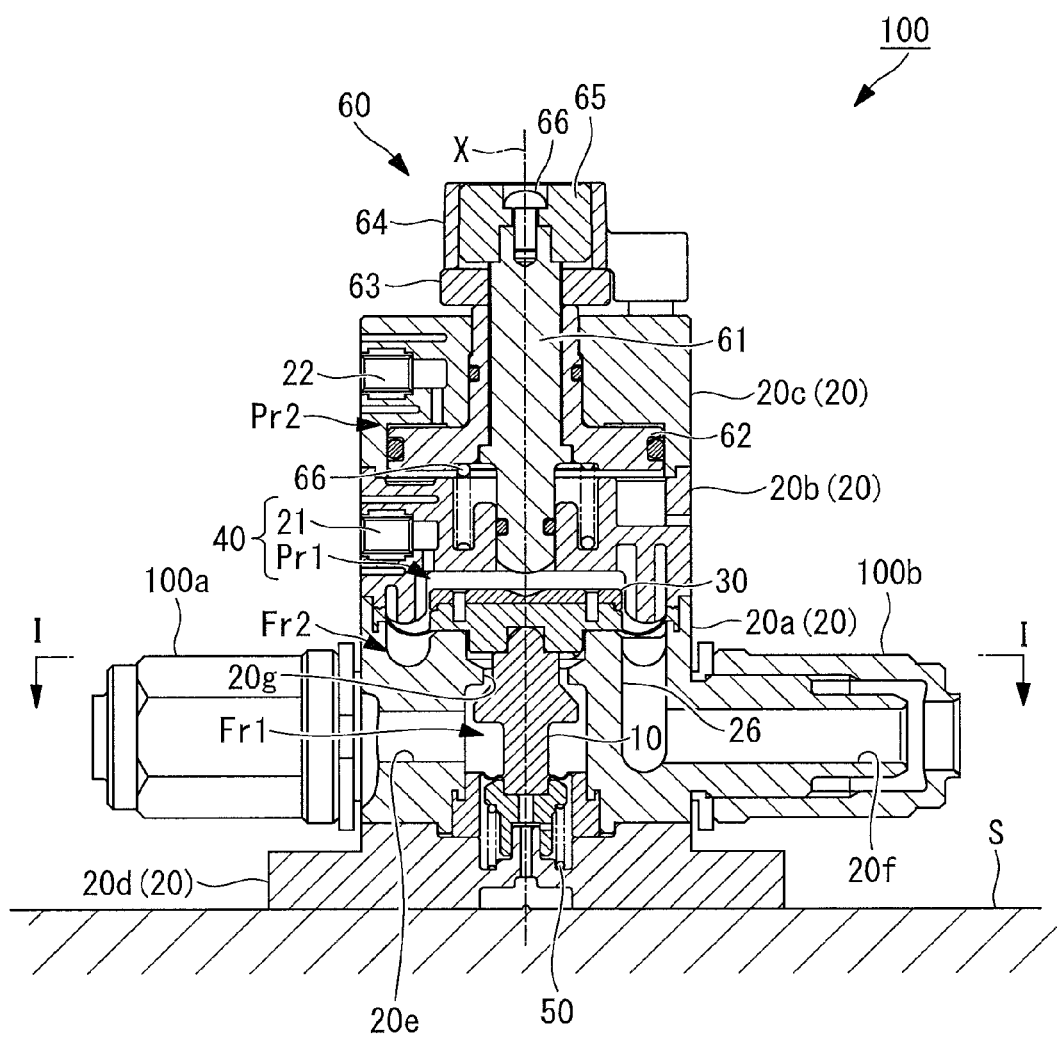
FIG. 2 is a partial longitudinal sectional view showing one embodiment of the flow rate adjusting device in an open state.

As shown in FIG. 2, the flow rate adjusting portion 40 guides the compressed air, which is supplied from the outside, to the first pressure chamber Pr1, thereby generating an urging force for moving the diaphragm portion 30 downward along the axis line X to obtain an open state in which the valve body portion 10 is spaced apart from the valve hole 20g. The flow rate adjusting portion 40 adjusts the compressed air to be supplied to the first pressure chamber Pr1 and adjusts the interval between the valve body portion 10 and the valve hole 20g, thereby adjusting the flow rate of the fluid passing through the valve hole 20g.

The spring 50 is an elastic member that imparts, to the valve body portion 10, an urging force (first urging force) in a direction in which the spring is in contact with the valve hole 20g, and is disposed on a lower surface of the attachment portion 11 of the valve body portion 10.

When a downward urging force (second urging force) that is imparted to the valve body portion 10 by the first pressure chamber Pr1 through the diaphragm portion 30 is larger than the upward urging force (first urging force) that is imparted to the valve body portion 10 by the spring 50, the valve body portion 10 is moved downward so as to be spaced apart from the valve hole 20g.

The slow leak mechanism 60 is a mechanism for finely adjusting the interval between the valve body portion 10 and the valve hole 20g when the upward urging force (first urging force) that is imparted to the valve body portion 10 by the spring 10 is larger than the downward urging force (second urging force) that is imparted to the valve body portion 10 by the first pressure chamber Pr1 through the diaphragm portion 30, and the valve body portion 10 moves upward.

The slow leak mechanism 60 includes a shaft 61, a piston portion 62, a lock nut 63, a lock cap 64, an operation portion 65, a spring 66, and a fastening bolt 67.

The outer peripheral surface of the shaft 61 is provided with a male screw, and the inner peripheral surface of the piston portion 62 is provided with a female screw. The fastening bolt 67, which is inserted into the through-hole formed in the columnar operation portion 65, is fasted into a fastening opening formed at an upper end of the shaft 61. A rotation of the piston portion 62 about the axis line X is restricted by a rotation preventing member (not shown) for restricting the rotation about the axis line X.

An operator of the flow rate adjusting device 100 operates the operation portion 65 to be rotated about the axis line X, thereby causing the shaft 61, which is coupled to the operation portion 65, to be rotated about the axis line X. In accordance with the rotation of the shaft 61 about the axis line X, the location of the shaft 61 in the direction of the axis line X with respect to the piston portion 62 is changed. This is because the inner peripheral surface of the piston portion 62 is provided with a female screw and the rotation of the piston portion 62 about the axis line X is restricted.

The spring 66 is disposed in the second body portion 20b and generates an urging force for urging the piston portion 62 upward along the axis line X. On the other hand, in the second pressure chamber Pr2, the compressed air supplied from the external compressed air supply source (not shown) to the compressed air introduction port 22 generates an urging force for urging the piston portion 62 downward along the axis line X.

When the urging force generated by the second pressure chamber Pr2 is larger than the urging force generated by the spring 66, the shaft 61 and the piston portion 62 are moved downward along the axis line X. Thus, a lower end of the shaft 61 projects toward the first pressure chamber Pr1.

When the urging force generated by the spring 50 is larger than the urging force generated by the first pressure chamber Pr1, the valve body portion 10 and the diaphragm portion 30 are moved upward. When an upper end of the diaphragm portion 30 comes into contact with a lower end of the shaft 61, the locations of the valve body portion 10 and the diaphragm portion 30 on the axis line X are fixed so as not to move upward any more. In this case, the interval between the valve body portion 10 and the valve hole 20g is determined depending on the location of the shaft 61 with respect to the piston portion 62.

Thus, the slow leak mechanism 60 causes the operation portion 65 to be rotated about the axis line X to adjust the location of the shaft 61 with respect to the piston portion 62, thereby enabling adjustment of the interval between the valve body portion 10 and the valve hole 20g when the valve body portion 10 is pressed against the valve hole 20g by the urging force of the spring 50. In other words, the adjustment of the location of the shaft 61 with respect to the piston portion 62 enables determination of the minimum flow rate of the fluid circulating in the flow rate adjusting device 100.

The lock nut 63 is an annular member having a structure in which a female screw to engage with a male screw formed on the outer peripheral surface of the shaft 61 is formed on the inner peripheral surface. The lock nut 63 is rotated to come into contact with the piston portion 62, thereby restricting the rotation of the shaft 61 about the axis line X.

The lock cap 64 is a member that covers a side surface (an operation surface that is operated by the operator) of the operation portion 65, thereby inhibiting the operation of the operation portion 65 by the operator.

Next, the structure of the downstream-side fluid chamber Fr2 for preventing the accumulation of the fluid in the chamber will be described with reference to FIGS. 3 to 6.

Figure 3:
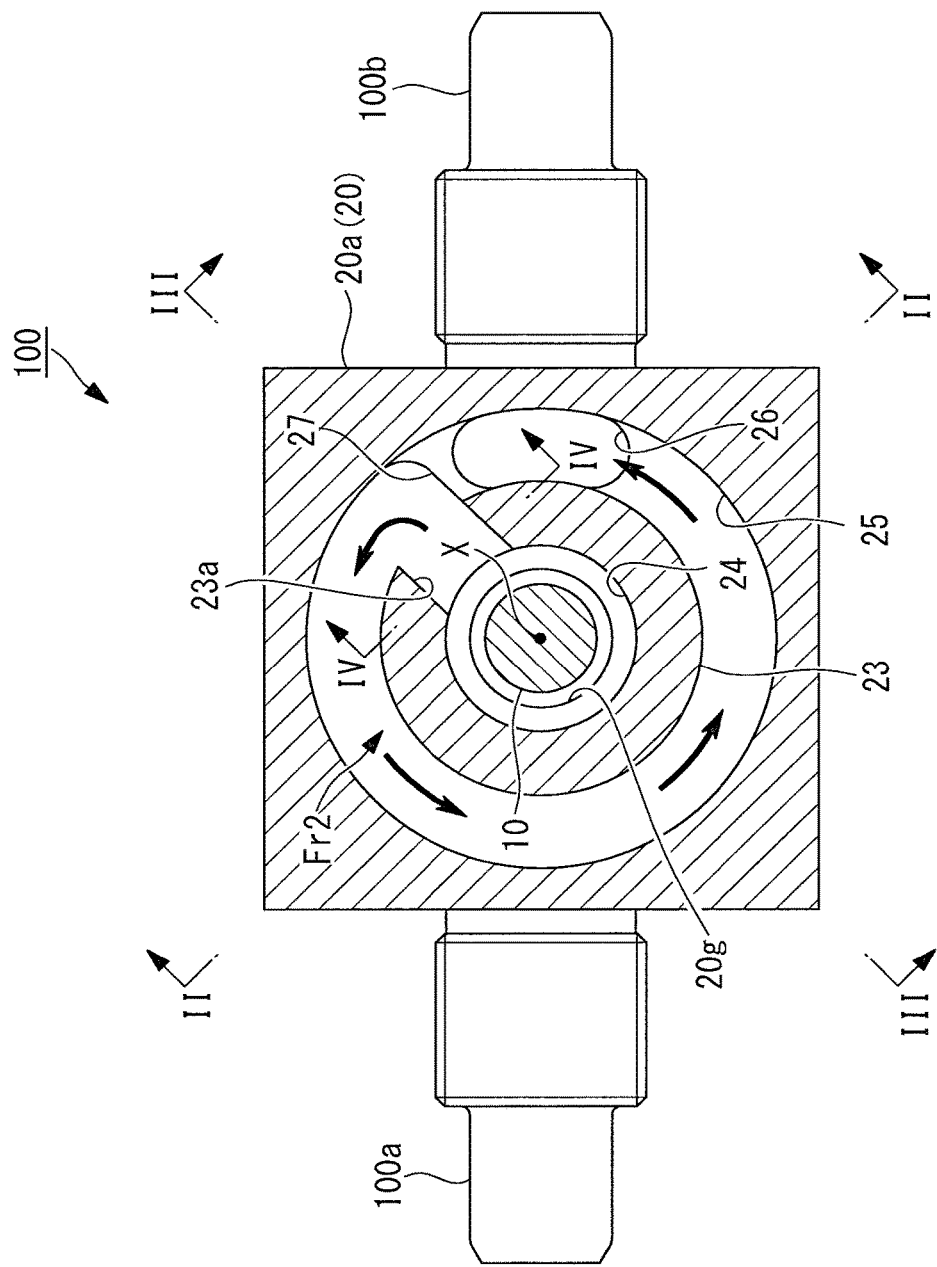
FIG. 3 is a sectional view taken along an arrow line I-I of the flow rate adjusting device shown in FIG. 2.

As shown in FIG. 3, the first body portion 20a includes an annular wall portion 23 that partitions the downstream-side fluid chamber Fr2 into an inside flow channel 24 and an outside flow channel 25.

Figure 5:
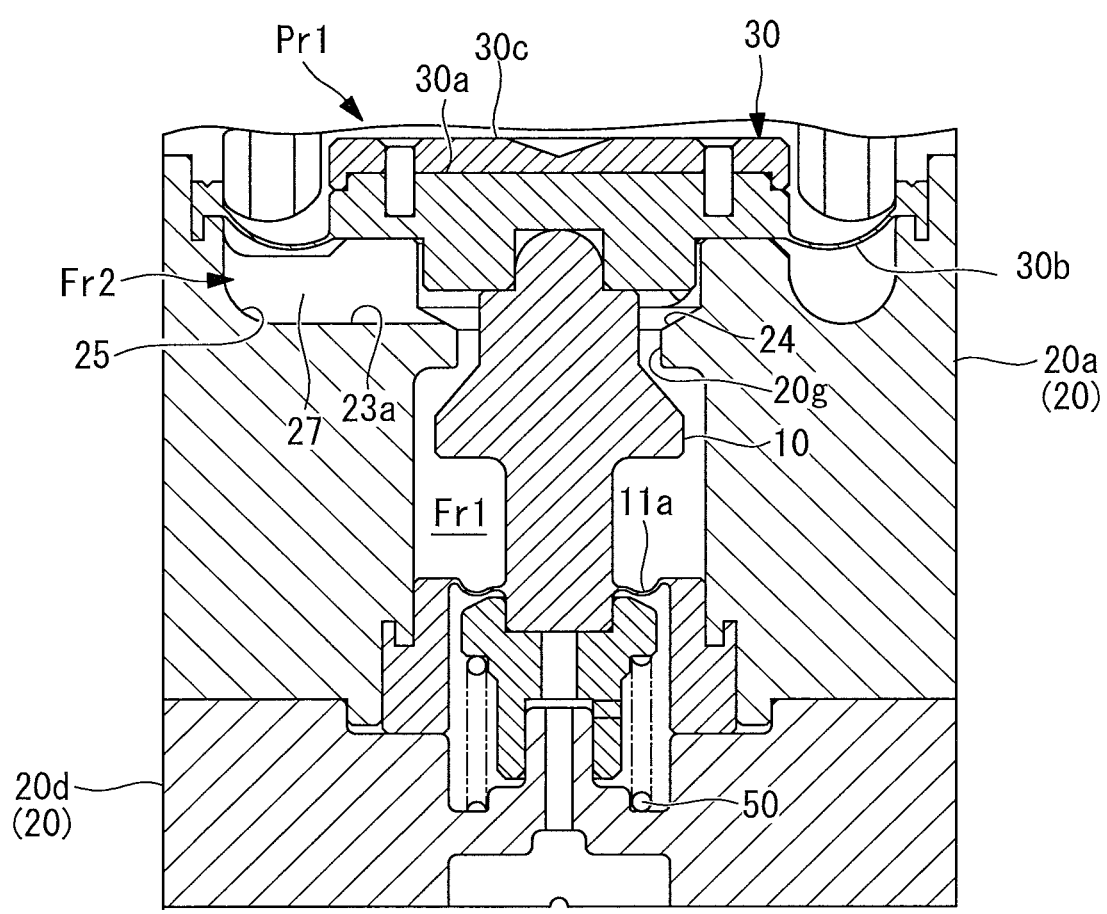
FIG. 5 is a sectional view taken along an arrow line III-III of the flow rate adjusting device shown in FIG. 3.

As shown in FIGS. 4 and 5, the inside flow channel 24 is a flow channel that is annularly formed about the axis line X and is formed so as to surround the valve body portion 10.

As shown in FIGS. 4 and 5, the outside flow channel 25 is a flow channel that is annularly formed about the axis line X, is disposed at an outside of the inside flow channel 24, and is formed so as to surround the annular wall portion 23.

As shown in FIGS. 3 and 5, the annular wall portion 23 includes a communication flow channel 23a that is formed at one section about the axis line X and guides the fluid from the inside flow channel 24 to the outside flow channel 25.

Figure 6:
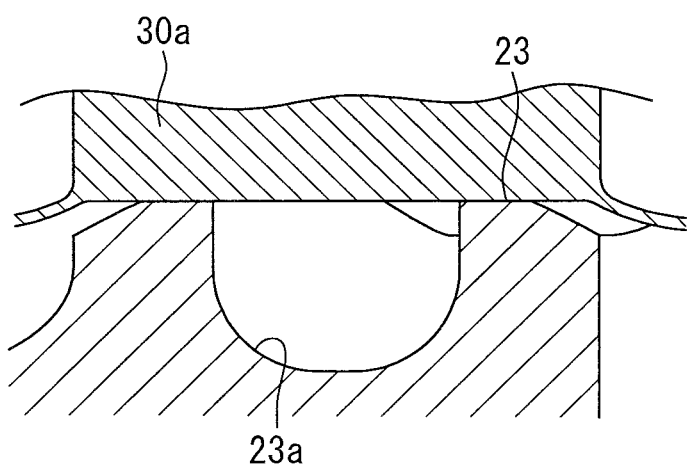
FIG. 6 is a sectional view taken along an arrow line IV-IV of the flow rate adjusting device shown in FIG. 3.

As shown in FIG. 6 (a sectional view taken along an arrow line IV-IV of the flow rate adjusting device shown in FIG. 3), the communication flow channel 23a is a flow channel that is formed so as to extend to the outer peripheral side from the inner peripheral side along a radial direction perpendicular to the axis line X. The fluid flowing into the inside flow channel 24 through the valve hole 20g flows into the outside flow channel 25 via the communication flow channel 23a. The communication flow channel 23a guides the fluid to a location that is adjacent to a blocking wall 27, which is described later, and is isolated from the outflow hole 26 by the blocking wall 27.

As shown in FIGS. 3 and 5, the first body portion 20a includes the blocking wall 27 which is disposed at a location adjacent to the outflow hole 26 that guides the fluid circulating in the outside flow channel 25 to the outflow-side flow channel 20f. The blocking wall 27 blocks the fluid flowing into the outside flow channel 25 from the communication flow channel 23a from being guided to the outflow hole 26 at a shortest distance, and also blocks the fluid, which has circulated in the outside flow channel 25 and reached the outflow hole 26, from flowing around the outside flow channel 25 and reaching again the location where the communication flow channel 23a is provided.

Thus, as indicated by arrows in FIG. 3, the downstream-side fluid chamber Fr2 has a structure in which the fluid flowing into the inside flow channel 24 from the valve hole 20g flows into the outside flow channel 25 at a location adjacent to the blocking wall 27 disposed so as to be adjacent to the outflow hole 26, and the fluid circulating substantially around the outside flow channel 25 is guided from the outflow hole 26 to the outflow-side flow channel 20f. Accordingly, it is possible to prevent such a failure that the fluid guided from the valve hole 20g to the downstream-side fluid chamber Fr2 is further guided to the outflow hole 26 at a shortest distance and the fluid is liable to be accumulated in the other areas.

Further, the shape of the outside flow channel 25 along the peripheral direction about the axis line X is maintained at a constant flow channel shape substantially about the axis line X from the location where the fluid flows in from the communication flow channel 23a to the outflow hole 26. Accordingly, a stable flow of the fluid with a substantially constant flow velocity is formed at each location of the outside flow channel 25, thereby preventing a failure due to an unstable flow of the fluid.

As shown in FIGS. 4 and 5, when the urging force generated by the first pressure chamber Pr1 is larger than the urging force generated by the spring 50, the base 30a of the diaphragm portion 30 and the annular wall portion 23 of the first body portion 20a are in contact with each other. In this state, the circulation of the fluid between the inside flow channel 24 and the outside flow channel 25 at a location other than the location where the communication flow channel 23a is disposed is interrupted, and the inside flow channel 24 and the outside flow channel 25 communicate with each other only in a portion corresponding to the communication flow channel 23a. Therefore, when the base 30a of the diaphragm portion 30 and the annular wall portion 23 of the first body portion 20a are in contact with each other, the whole amount of the fluid circulating in the inside flow channel 24 passes through the communication flow channel 23a and flows into the outside flow channel 25.

The operation and effects of the flow rate adjusting device 100 of this embodiment described above will be described.

According to the flow rate adjusting device 100 of this embodiment, the fluid flowing into the inside flow channel 24 of the downstream-side fluid chamber Fr2 from the valve hole 20g is guided to the outside flow channel 25 through the communication flow channel 23a included in the annular wall portion 23. The fluid guided to the outside flow channel 25 flows into a location that is adjacent to the blocking wall 27 and is isolated from the outflow hole 26 by the blocking wall 27, circulates along a direction apart from the blocking wall 27, and finally reaches the outflow hole 26. The fluid which has reached the outflow hole 26 is blocked from flowing around the outside flow channel 25 by the blocking wall 27, so that the whole amount of the fluid is guided to the outflow-side flow channel 20f through the outflow hole 26.

In the outside flow channel 25, a flow of the fluid circulating in one direction from the location isolated from the outflow hole 26 by the blocking wall 27 to the location of the outflow hole 26 after flowing substantially about the axis line X is generated, thereby preventing the fluid from being accumulated in the downstream-side fluid chamber Fr2. Further, since the outside flow channel 25 is formed substantially about the axis line X, a pressure from the fluid circulating in the outside flow channel 25 can be uniformly imparted to each location of the diaphragm portion 30.

Thus, the flow rate adjusting device 100 according to one aspect of the present disclosure can prevent a failure due to accumulation of the fluid by guiding the fluid to the outflow hole 26 without accumulating the fluid flowing from the space between the valve body portion 10 and the valve hole 20g into the downstream-side fluid chamber Fr2, in the downstream-side fluid chamber Fr2.

In the flow rate adjusting device 100 of this embodiment, when the base 30a of the diaphragm portion 30 and the annular wall portion 23 are in contact with each other, the circulation of the fluid between the inside flow channel 24 and the outside flow channel 25 is interrupted at a location other than the location where the communication flow channel 23a is disposed.

With this structure, in the open state in which the base 30a of the diaphragm portion 30 and the annular wall portion 23 are in contact with each other, the whole amount of the fluid flowing into the inside flow channel 24 of the downstream-side fluid chamber Fr2 from the valve hole 20g flows into the outside flow channel 25 from the location where the communication flow channel 23a is disposed, and the fluid does not flow into the outside flow channel 25 from the other locations. Accordingly, a flow of the fluid that circulates in one direction to the location of the outflow hole 26 substantially about the axis line X from the location isolated from the outflow hole 26 by the blocking wall 27 can be more reliably formed, thereby preventing the accumulation of the fluid.

The invention claimed is:

1. A flow rate adjusting device comprising:
a valve body portion movable along an axis line;
a body portion having a valve hole into which the valve body portion is inserted;
a diaphragm portion that is coupled to the valve body portion and partitions an inside space of the body portion into a fluid chamber and a gas chamber, a fluid flowing in from the valve hole circulating in the fluid chamber; and
a flow rate adjusting portion that adjusts an interval between the valve body portion and the valve hole by allowing the diaphragm portion to move along the axis line, wherein
the body portion includes:
an inflow-side flow channel that guides a fluid flowing in from an inflow port to the fluid chamber;
an outflow-side flow channel that guides a fluid flowing out from the fluid chamber to an outflow port;
an annular wall portion that partitions the fluid chamber into an inside flow channel and an outside flow channel, the inside flow channel being annularly formed around the valve body portion, the outside flow channel being annularly formed at an outside of the inside flow channel;
an outflow hole that guides a fluid circulating in the outside flow channel to the outflow-side flow channel; and
a blocking wall that is disposed in the outside flow channel and blocks the fluid having reached the outflow hole from flowing around the outside flow channel,
the annular wall portion includes a communication flow channel that guides the fluid from the inside flow channel to the outside flow channel, and
the communication flow channel guides the fluid to a location that is adjacent to the blocking wall and is isolated from the outflow hole by the blocking wall.

2. The flow rate adjusting device according to claim 1, wherein
the diaphragm portion includes:
a base to be coupled to the valve body portion; and
a thin-film portion that is connected to an outer peripheral end of the base and is annularly formed,
when the base and the annular wall portion are in contact with each other, a circulation of the fluid in a space between the inside flow channel and the outside flow channel is interrupted at a location other than a location where the communication flow channel is disposed.

3. The flow rate adjusting device according to claim 2, further comprising an urging member that imparts, to the valve body portion, a first urging force in a direction in which the urging member is in contact with the valve hole, and
the flow rate adjusting portion imparts, to the valve body portion, a second urging force in a direction in which the flow rate adjusting portion is spaced apart from the valve hole by a compressed air introduced into the gas chamber.

* * * * *